April 3, 1956 J. MONTANA 2,740,484
MOTOR DRIVEN STAIR CLIMBING HAND TRUCK
Filed Aug. 26, 1950 3 Sheets-Sheet 1
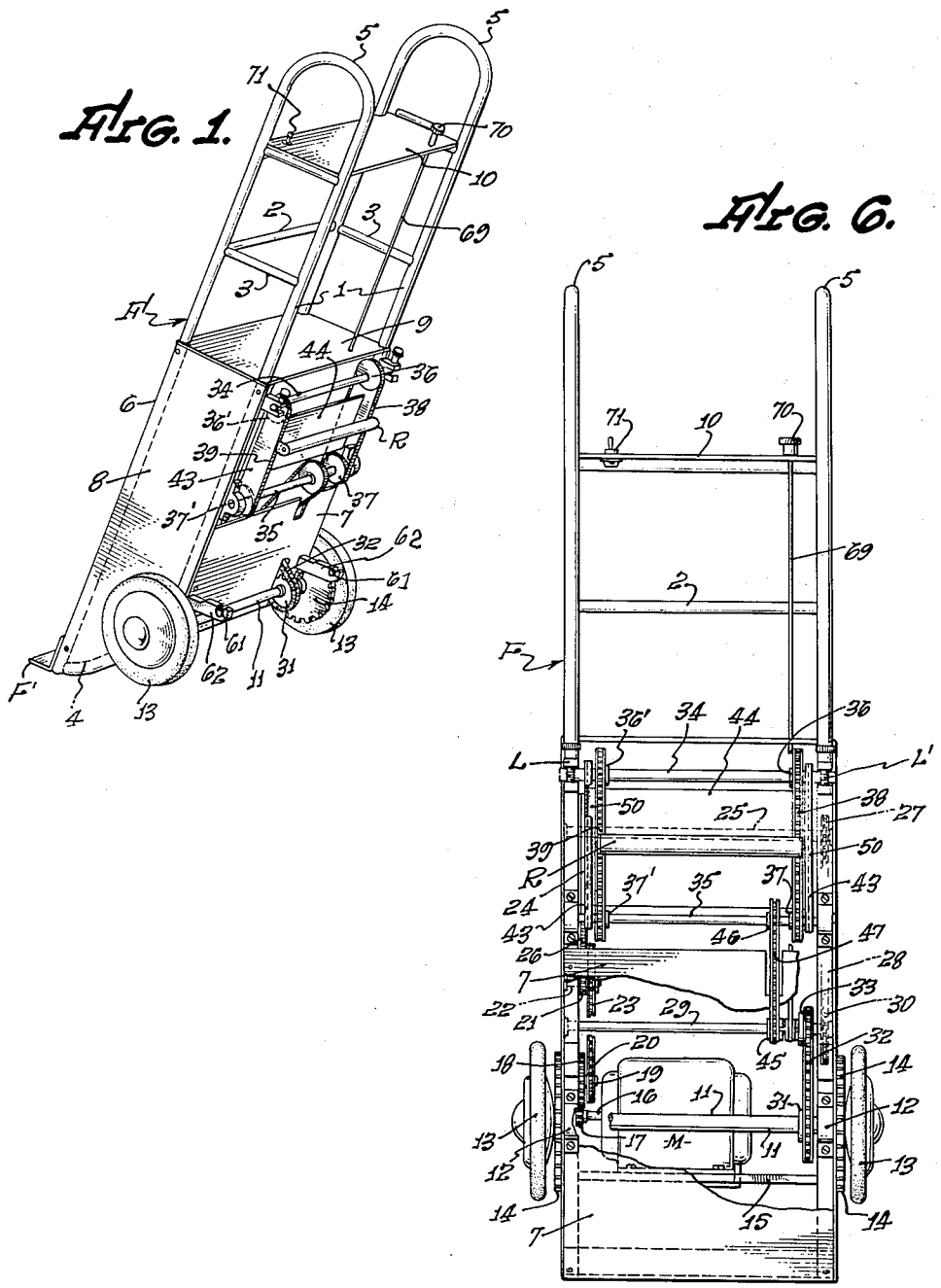
INVENTOR
JAMES MONTANA April 3, 1956        J. MONTANA        2,740,484
MOTOR DRIVEN STAIR CLIMBING HAND TRUCK
Filed Aug. 26, 1950        3 Sheets-Sheet 2
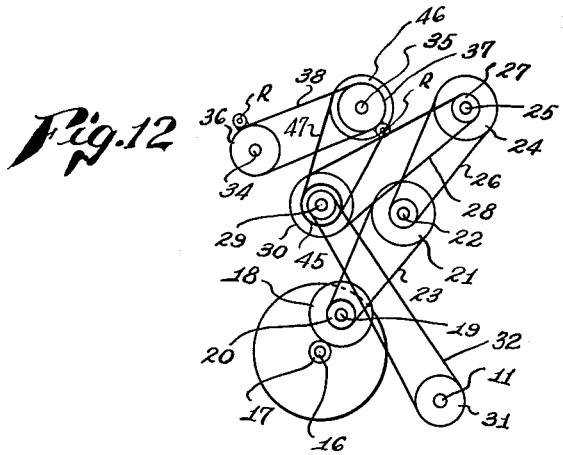
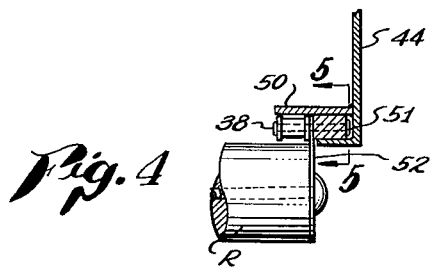
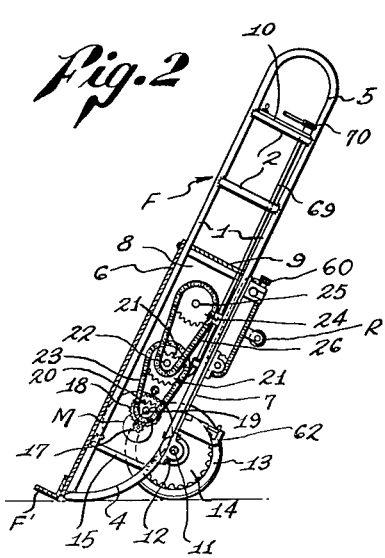
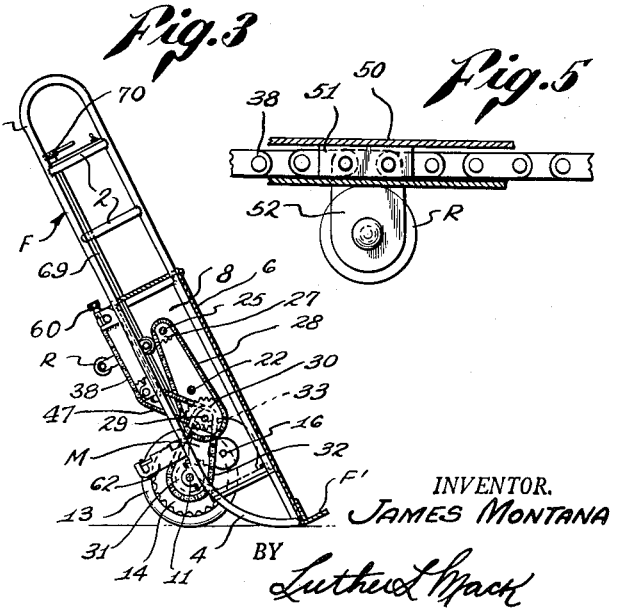
INVENTOR.
JAMES MONTANA
BY Luther L. Mack
Attorney April 3, 1956  J. MONTANA  2,740,484
MOTOR DRIVEN STAIR CLIMBING HAND TRUCK
Filed Aug. 26, 1950  3 Sheets-Sheet 3

INVENTOR.
JAMES MONTANA
BY Luther L. Mack
Attorney

United States Patent Office 2,740,484
Patented Apr. 3, 1956

2,740,484

MOTOR DRIVEN STAIR CLIMBING HAND TRUCK

James Montana, Glendale, Calif.

Application August 26, 1950, Serial No. 181,611

5 Claims. (Cl. 180—19)

This invention relates to and has for a principal object the provision of a motor driven stair climbing hand truck so arranged as to selectively apply power to the traction wheels for propelling the truck over a flat surface or upwardly on a ramp or track, and upwardly on a stairway in a step-by-step ascent, under the guidance and control of an operator.

An important object is to provide improved stair climbing means including parallel transverse shafts on the truck frame operatively connected by chains or the like and having at least a pair of stair tread engaging rollers secured to said chains for alternate engagement with the stair treads as the truck ascends or descends the stairs, together with means for guiding the chains on ascending cycles so as to depose the tread rollers in succession on alternate stair treads without defacing the treads or risers.

Another object is to arrange the stair climbing mechanism so as it will swing upwardly out of stair climbing position as when the truck is moved over a horizontal or inclined surface, and means for locking the stair climbing unit in operative and inoperative positions.

Other objects may appear as the description progresses.

I have shown a preferred embodiment of my invention in the accompanying drawings in which:

Fig. 1 is a perspective view showing the traction and stair climbing means as seen from the rear;

Figs. 2 and 3 are similar views of opposite sides of the truck with the gear housing removed;

Fig. 4 is a fragmentary view of one of the stair climbing rollers and guide therefor on line 4—4 of Fig. 7;

Fig. 5 is a sectional view of the elements of Fig. 4 on line 5—5 of Fig. 4;

Fig. 6 is a rear view of the truck with the back cover partly cut away;

Fig. 12 is a diagram of the power transmission elements and interconnections.

Figure 7:
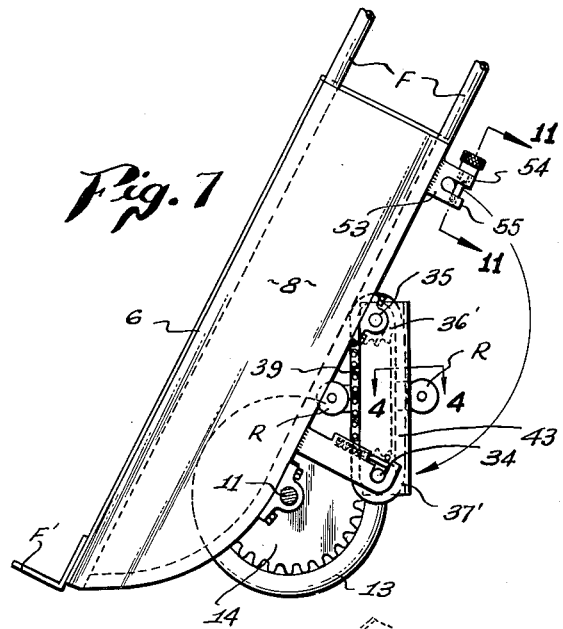
Fig. 7 is a part side view showing the stair climbing unit swung downwardly to and locked in operative position.

Preferably, the truck has a rigid skeleton frame F composed of spaced side members each formed of U-shaped rods or tubes with parallel legs 1, 1 and transverse members 2, which are welded or otherwise rigidly secured to said legs. The two side members are connected by a plurality of members 3. The rear legs 1 of each side member are bent forwardly at 4 to and are joined to the front legs and the legs 1 of each side frame member are joined at the top of the frame by curved sections 5 so as to provide convenient hand grips for manually steering the truck in movement.

The lower portion of the truck is provided with a sheet metal housing formed by a front plate 6, a back plate 7, similar side plates 8 and a top plate 9, all of which are suitably secured to the frame members for individual removal for any purpose. A top plate, or shelf, 10 is also provided for convenience of an operator on which certain control devices are mounted and which will be hereinafter described.

At the bottom of the truck frame an axle 11 is mounted in bearings 12, 12 fixed to back plate 7 or rear legs 1 of the side members of the frame. Traction wheels 13 are fixed to the outer ends of axle 11 outwardly of plates 8 and between each bearing 12 and adjacent wheel 13 a traction gear 14 is fixed either to the axle or to the wheel for common rotation with the wheels. A load carrying shoe F' is fixed to frame F at its bottom for supporting packages, crates, etc.

Power is selectively applied to the traction wheels and gears and to the climbing unit from an electric motor M, which is mounted on a bottom plate 15 of the frame, through speed reduction gears or chains in the manner now to be described, or otherwise. As shown, motor spindle 16 carries a pinion 17 which drives a larger gear 18 mounted on a stud 19 at one side of the frame and a small sprocket 20 is fixed to and for rotation with gear 18, thereby providing an initial gear reduction. A second gear reduction is effected by connecting sprocket 20 with a larger sprocket 21 on a stud 22, secured to the frame F, through a chain 23.

A third gear reduction is effected by connecting sprocket 21 with a larger sprocket 24 on a transverse idler shaft 25 as by means of a chain 26. A further gear reduction is effected by connecting shaft 25 through a sprocket 27 and a chain 28 with a drive shaft 29 through a sprocket 30. Said drive shaft serves as a master driving medium from which power is directly applied at desired ratio to the axle 11 and the climbing unit.

Axle 11 bears a sprocket 31 which is driven by a chain 32 operating over a smaller sprocket 33 on drive shaft 29. The climbing unit includes a pair of parallel horizontal shafts 34 and 35 carrying pairs of sprockets 36 and 36' and 37 and 37' and having alined sprockets at 36—37 and 36'—37' connected, respectively, by chains 38 and 39. Uppermost shaft 34 is journalled in bearings secured to opposite sides of the frame F (Fig. 6) while the lower shaft 35 is rotatable in opposite sides 43 of a cover 44 swingably mounted on the axis of shaft 35 for adjustment to and from operative position. The climbing unit is driven from shaft 29 by a sprocket 45 and a sprocket 46 on shaft 35 connected by a chain 47.

As shown in Figs. 4 and 5, a channeled guide 50 is provided on the rear side of cover 44 for each of the chains 38 and 39 in which the chains move on their downward cycles so as to provide guards against damage to the stair treads and to direct their movement in straight paths in a climbing operation. Short bars 51 are attached to the chains 38 and 39 for guiding and stiffening the chains throughout climbing cycles. One or more, but preferably two climbing rollers R are affixed to chains 38 and 39 and also to bars 51 at their opposite ends as by plates 52 by extending the link pintles of the chain through said plates and bars. Thus, as the rollers R move downwardly in succession the bars 51 enter the open ends of and traverse the channels in guides 50 and emerge from the lower ends of the guides prior to a reverse upward movement of the climbing rollers R.

Figure 8:
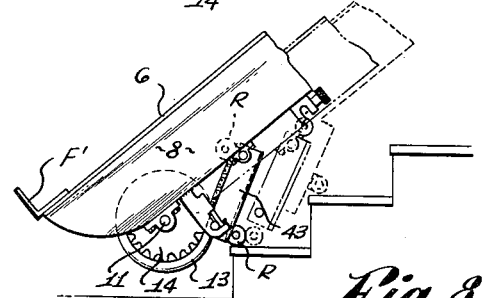
Fig. 8 is a reduced scale view of the truck arranged as in Fig. 7 and in process of ascending stairs.
Figure 11:
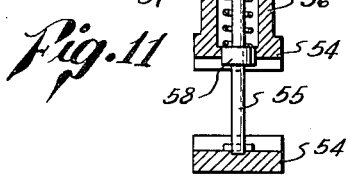
Fig. 11 is a sectional elevation in a diametrical plane of a lock for holding the climbing unit in adjusted position.

The climbing unit is inoperatively positioned in Figs. 1, 2 and 3 and operative when positioned as shown in Figs. 7 and 8. When inoperative said unit is so held as by means of latches L and L' at opposite sides as shown in detail in Figs. 1, 7 and 11. Each latch includes a bifurcated bracket 53 attached to frame F and adapted to receive shaft 34 when the unit is swung upwardly. Said shaft 34 is held between the furcations 54 of bracket 53 by a retaining pin 55 borne by a fixture 56 in which said pin is slidable against the tension of a compression spring 57 confined between an enlargement 58 on the pin and a fixed disc 59. Pin 55 is retracted to release the climbing unit by means of a cap 60 fixed to the upper end of said pin and overlying the top of fixture 56. The brackets 53 thus provide bearings for the reception of the opposite ends of the shaft 34.

When the climbing unit is swung downwardly to operative position on the axis of shaft 35 it may be latched in grooves 61 of rearwardly projecting bars 62 secured to frame F, by suitable means, if necessary, similar to or different from that provided for locking the unit in inoperative position. The bars 62 thus provide bearings at the bottoms of the grooves 61 for the opposite ends of the shaft 34 when it is located therein.

Figure 9:
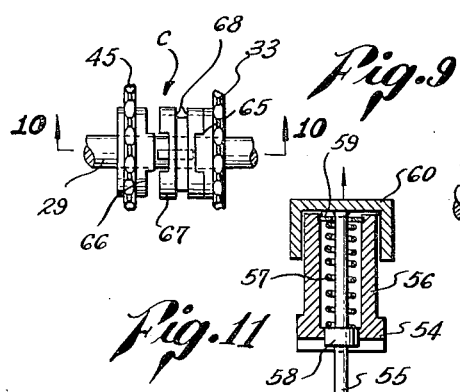
Fig. 9 is a view of a clutch borne by the truck frame for selectively applying power to the traction and climbing means.
Figure 10:
Fig. 10 is a sectional view of the clutch on line 10—10 of Fig. 9.

It will be understood that when power is applied to traction wheels 13 and traction gears 14 through axle 11 by the means disclosed the truck will move under its own power over a horizontal or inclined surface or upwardly on a track, but when power is applied to the climbing unit as for a stair climbing operation the power is disconnected from said traction elements. The operation of the truck is therefore made selective through the provision of a manually operable clutch C (Figs. 9 and 10) including driving members 65 and 66 loose on countershaft 29 and an intermediate member 67 fixed to but axially slidable on the countershaft for operatively connecting axle 11 therewith through chain 32 or for connecting the climbing unit with the shaft 29 through chain 47. Clutch members 65, 66 and 67 have interlocking lugs and recesses on adjacent faces and are so arranged that member 67 can lock with one of the other members 65 or 66 at one time.

Member 67 has an annular groove 68 thereon adapted to receive the lower end of an operating rod 69 so that when said rod is actuated requisitely from its upper end as by a knob or button 70 the member 67 will be moved appropriately to engage one of the members 65 and 66.

Preferably the clutch operating button 70 together with a suitable switch 71 for controlling operation of motor M are mounted on top plate 10 of the frame for convenience of an operator.

In operation, when a load is borne by the truck and rests upon the foot plate F' it may be transported over a horizontal surface or upwardly over an inclined surface by application of power to the axle 11 and wheels 13 from a point of loading to a point of unloading.

The invention, broadly considered, consists in the provision of a self-propelled hand truck with the two methods of propulsion, to wit: over a horizontal or inclined plane surface by employment of the traction wheels 13; and upwardly on a stairway by employment of the climbing rollers R in a step-by-step movement; together with means for selectively applying power to said elements and the specific form and arrangement of parts as shown in the drawings and hereinafter defined by the claims.

It will be noted that motor M drives a driving shaft 29 which, in turn, drives axle 11 or a first driven shaft 35, while the second driven shaft 34 is driven from the shaft 35.

I claim:

1. A self propelled stair climbing and traction hand truck comprising: a main frame, a transverse axle journalled on opposite sides of said frame, traction wheels on said axle, a driving shaft, a first driven shaft drivingly connected with said driving shaft on a fixed transverse axis, a second driven shaft on said frame connected by chain driving means with said first driven shaft and arcuately adjustable relative to the first driven shaft, a plurality of rollers supported on the chain driving means between said first and second driven shafts, a rigid member hinged on said first driven shaft for supporting said second driven shaft in spaced position from said first driven shaft, and bearings on said main frame at equal distance from and on opposite sides of said first driven shaft for selectively receiving and supporting said second driven shaft when said second driven shaft is swung to different positions to render said rollers operative for climbing stairs, and inoperative as when said traction wheels are operative for moving the truck over a plane surface.

2. A self propelled stair climbing and traction hand truck comprising: a main frame, a transverse axle journalled on opposite sides of said frame, traction wheels on said axle, a driving shaft, a first driven shaft drivingly connected with said driving shaft on a fixed transverse axis, a second driven shaft on said frame connected by chain driving means with said first driven shaft and arcuately adjustable relative to the first driven shaft, a plurality of rollers supported on the chain driving means between said first and second driven shafts, a rigid member hinged on said first driven shaft for supporting said second driven shaft in spaced position from said first driven shaft, and bearings on said main frame at equal distance from and on opposite sides of said first driven shaft for selectively receiving and supporting said second driven shaft when said second driven shaft is swung to different positions to render said rollers operative for climbing stairs, and inoperative as when said traction wheels are operative for moving the truck over a plane surface, and latches on said bearings for holding said rollers in adjusted positions.

3. A self propelled stair climbing and traction hand truck comprising: a main frame, a transverse axle journalled on opposite sides of said frame, traction wheels on said axle, a driving shaft, a first driven shaft drivingly connected with said driving shaft on a fixed transverse axis, a second driven shaft on said frame connected by chain driving means with said first driven shaft and arcuately adjustable relative to the first driven shaft, a plurality of rollers supported on the chain driving means between said first and second driven shafts, a rigid member hinged on said first driven shaft for supporting said second driven shaft in spaced position from said first driven shaft, and bearings on said main frame at equal distance from and on opposite sides of said first driven shaft for selectively receiving and supporting said second driven shaft when said second driven shaft is swung to different positions to render said rollers operative for climbing stairs, and inoperative as when said traction wheels are operative for moving the truck over a plane surface, and a clutch mechanism interposed between and for at times operatively connecting said driving shaft with said first driven shaft.

4. A self propelled stair climbing and traction hand truck comprising: a main frame, a transverse axle journalled on opposite sides of said frame, traction wheels on said axle, a driving shaft, a first driven shaft drivingly connected with said driving shaft on a fixed transverse axis, a second driven shaft on said frame connected by chain driving means with said first driven shaft and arcuately adjustable relative to the first driven shaft, a plurality of rollers supported on the chain driving means between said first and second driven shafts, a rigid member hinged on said first driven shaft for supporting said second driven shaft in spaced position from said first driven shaft, and bearings on said main frame at equal distance from and on opposite sides of said first driven shaft for selectively receiving and supporting said second driven shaft when said second driven shaft is swung to different positions to render said rollers operative for climbing stairs, and inoperative as when said traction wheels are operative for moving the truck over a plane surface, and a manually operable clutch on said driving shaft for selectively applying power to said axle and to said first driven shaft.

5. A self propelled stair climbing and traction hand truck comprising: a main frame, a transverse axle journalled on opposite sides of said frame, traction wheels on said axle, a driving shaft, a first driven shaft drivingly connected with said driving shaft on a fixed transverse axis, a second driven shaft on said frame connected by chain driving means with said first driven shaft and arcuately adjustable relative to the first driven shaft, a plurality of rollers supported on the chain driving means between said first and second driven shafts, a rigid member hinged on said first driven shaft for supporting said second driven shaft in spaced position from said first driven shaft, and bearings on said main frame at equal distance from and on opposite sides of said first driven shaft for selectively receiving and supporting said second driven shaft when said second driven shaft is swung to different positions to render said rollers operative for climbing stairs, and inoperative as when said traction wheels are operative for moving the truck over a plane surface, said rollers being so arranged on the driving means connecting the first and second driven shafts as to successively engage steps of stairs in an ascending or descending operation.

References Cited in the file of this patent

UNITED STATES PATENTS

| | | |
|---|---|---|
| 654,291 | Stith | July 24, 1900 |
| 710,845 | Cummins | Oct. 7, 1902 |
| 951,842 | Pratt | Mar. 15, 1910 |
| 1,292,022 | Newman et al. | Jan. 21, 1919 |
| 1,523,364 | Batchelder | Jan. 13, 1925 |
| 1,942,809 | Gerrish | Jan. 9, 1934 |
| 2,193,283 | Harberson | Mar. 12, 1940 |
| 2,383,754 | Watt | Aug. 28, 1945 |
| 2,400,824 | Jackson | May 21, 1946 |
| 2,565,237 | Kinter | Aug. 21, 1951 |
| 2,597,532 | Richardson et al. | May 20, 1952 |
| 2,620,041 | Chenette et al. | Dec 2, 1952 |

FOREIGN PATENTS

| | | |
|---|---|---|
| 577,797 | Germany | July 13, 1932 |